United States Patent

Greenberg et al.

[11] Patent Number: 6,003,062
[45] Date of Patent: Dec. 14, 1999

[54] ITERATIVE ALGORITHM FOR PERFORMING MAX MIN FAIR ALLOCATION

[75] Inventors: Martin G. Greenberg, Mars; Steven J. Schlick, Wexford, both of Pa.

[73] Assignee: FORE Systems, Inc., Warrendale, Pa.

[21] Appl. No.: 08/895,353

[22] Filed: Jul. 16, 1997

[51] Int. Cl.[6] ............ H04Q 11/04; H04L 12/56; H04L 12/26; H04L 12/24
[52] U.S. Cl. ............ 709/104; 709/103; 709/105; 709/107; 709/232; 709/234; 709/235; 370/232; 370/234; 370/230
[58] Field of Search ............ 709/102, 103, 709/104, 107, 232, 234, 235, 105; 370/230, 231, 391, 395, 232, 234

[56] References Cited

U.S. PATENT DOCUMENTS

| | | | |
|---|---|---|---|
| 5,313,454 | 5/1994 | Bustini et al. | 370/231 |
| 5,479,404 | 12/1995 | Francois et al. | 370/468 |
| 5,533,020 | 7/1996 | Byrn et al. | 370/395 |
| 5,546,377 | 8/1996 | Ozveren | 370/253 |
| 5,633,859 | 5/1997 | Jain et al. | 370/234 |
| 5,675,576 | 10/1997 | Kalampoukas et al. | 370/232 |
| 5,689,508 | 11/1997 | Lyles | 370/391 |
| 5,737,313 | 4/1998 | Kolarov et al. | 370/234 |
| 5,745,697 | 4/1998 | Charny et al. | 709/233 |
| 5,748,901 | 5/1998 | Afek et al. | 709/238 |
| 5,754,530 | 5/1998 | Awdeh et al. | 370/232 |
| 5,793,747 | 8/1998 | Kline | 370/230 |
| 5,805,577 | 9/1998 | Jain et al | 370/234 |
| 5,805,599 | 9/1998 | Mishra et al. | 370/468 |
| 5,831,971 | 11/1998 | Bonomi et al. | 370/230 |
| 5,844,890 | 12/1998 | Delp et al. | 370/230 |
| 5,864,538 | 1/1999 | Chong et al. | 370/235 |
| 5,917,822 | 6/1999 | Lyles et al. | 370/395 |

*Primary Examiner*—Ahmad F. Matar
*Assistant Examiner*—William D. Thomson
*Attorney, Agent, or Firm*—Ansel M. Schwartz

[57] ABSTRACT

The present invention pertains to a method for providing service to entities. The method comprises the steps of receiving a first request for service by a server within a predetermined time from a first entity. Next there is the step of receiving a second request for service by the server within the predetermined time from a second entity. Then there is the step of reducing the service to be provided by the server to the first entity so the second entity can be provided service by the server within the predetermined time. The present invention pertains to a system for providing service. The system comprises N entities, where N is greater than or equal to 2. Each of the N entities require service. The system comprises a server which provides service to the N entities. Also, the system comprises a scheduler connected to the entities and the server. The scheduler provides service to the N entities by reducing the amount of service to at least one of the N entities from the server until all of the N entities receive their minimum amount of service.

20 Claims, 2 Drawing Sheets

ITERATIVE ALGORITHM FOR PERFORMING MAX MIN FAIR ALLOCATION

FIELD OF THE INVENTION

The present invention is related to providing service to entities. More specifically, the present invention is related to providing service to N entities by reducing the amount of service to at least one of the N entities from the server until all of the N entities receive their minimum amount of service.

BACKGROUND OF THE INVENTION

In many applications, multiple entities have demands for a service or resource where the aggregate demand exceeds the total resources available. In such a situation, the goal is to allocate the available resources in a fair manner among the entities. Some systems, such as an ABR capable ATM adapter, require this allocation to be performed quickly and repeatedly due to the dynamic nature of the demands on the shared resource.

In the past, this task has been done in one of two basic ways; using implicit allocation or explicit allocation. Implicit allocation services each entity according to a policy, such as round-robin or weighted round-robin, and the shared resources are "allocated" as the entities use them during their turn to be serviced. Explicit allocation attempts to calculate using some criterion, such as proportional allocation or max-min fairness, the amount of resources to be provided to each entity which can then be used to determine when to service each entity.

The different methods of performing allocation vary in complexity of implementation, fairness, accuracy, and failure modes. Explicit allocation using the max-min fairness criterion is considered to be one of the best methods for performing this task, but it has been considered impractical to use due to the time to perform and complexity of the calculations required especially when the number of entities is "large". The algorithm presented provides a simple, quick method of performing an explicit max-min fair allocation and can be customized for a variety of applications.

SUMMARY OF THE INVENTION

The present invention pertains to a method for providing service to entities. The method comprises the steps of receiving a first request for service by a server within a predetermined time from a first entity. Next there is the step of receiving a second request for service by the server within the predetermined time from a second entity. Then there is the step of reducing the service to be provided by the server to the first entity so the second entity can be provided service by the server within the predetermined time.

The present invention pertains to a system for providing service. The system comprises N entities, where N is greater than or equal to 2. Each of the N entities require service. The system comprises a server which provides service to the N entities. Also, the system comprises a scheduler connected to the entities and the server. The scheduler provides service to the N entities by reducing the amount of service to at least one of the N entities from the server until all of the N entities receive their minimum amount of service.

The basic algorithm of the preferred embodiment produces a rate assignment for a given connection using a combination of some global and per connection information. Each time the set of connections is run through the allocation algorithm, the rate assignments are adjusted such that they quickly converge to a max-min fair allocation.

For situations, such as ATM network equipment, where there are requirements for handling different types of connections with different identifying parameters, prioritization of connections based on service class, or minimum rate guarantees the max-min fairness can be enhanced by adding branches to the decision process. Multiple service classes can be supported by simply selecting the appropriate parameter to use in the fairness algorithm based upon service class. Minimum requirements can be met by either using the fair share for resources left after meeting the minimum requirements or by having the fair share be bounded by (i.e. no less than) the minimum requirement. Similarly, higher priority connections' demands can met first and bypass the fairness algorithm altogether.

In addition to the flexibility available by adding branches to the decision tree, the basic algorithm contains three other points for customization. The most simple is to change the initialization value for the total available bandwidth to allow the use of this algorithm with whatever speed physical interface (OC3, OC12, etc. where OC3 is optical carrier 3 equivalent to a data rate of 155.52 Mb/sec. and OC12 is optical carrier 12 equivalent to a data rate of 622.08 Mb/sec.) desired. The other two points involve the movable ceiling which represents the current max-min fair share. The algorithm operates similarly to Newton's method for finding the solution to an algebraic equation in that it incrementally adjusts the ceiling (i.e. the solution to the problem) in a series of smaller and smaller steps until it reaches the fair share for the current set of bandwidth requests. The adjustments are made according to two equations, one for increasing the ceiling when there is free bandwidth available and one for decreasing the ceiling when a new demand exceeds the bandwidth currently available.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
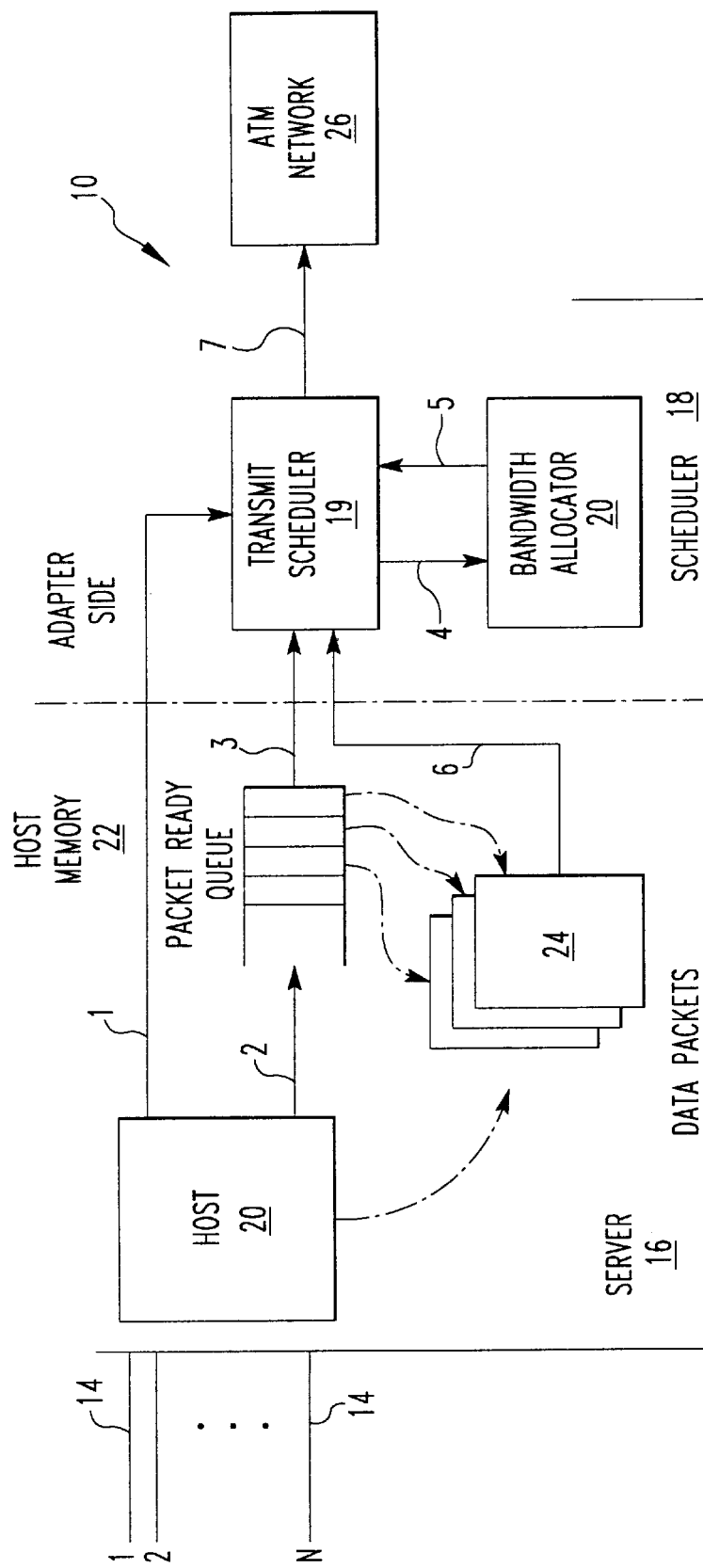
FIG. 1 is a schematic representation of a system of the present invention.

Referring now to the drawings wherein like reference numerals refer to similar or identical parts throughout the several views, and more specifically to FIG. 1 thereof, there is shown a system 10 for providing service. The system 10 comprises N entities 14, where N is greater than or equal to 2. Each of the N entities 14 require service. Each of the N entities 14 preferably require at least a minimum amount of service. The system 10 comprises a server 16 which provides service to the N entities 14. Also, the system 10 comprises a scheduler 18 connected to the entities 14 and the server 16. The scheduler 18 provides service to the N entities 14 by reducing the amount of service to at least one of the N entities 14 from the server 16 until all of the N entities 14 receive their minimum amount of service. Preferably, the N entities 14 receive a share of service equal to their minimum service plus a max-min fair share of the excess service available.

The scheduler 18 preferably includes a transmit scheduler. The scheduler 18 preferably also includes a bandwidth allocator 20 which controls the amount of service by the server 16 to the N entities 14 so each of the N entities 14 receives at least its minimum required amount of service. The scheduler 18 preferably increases the amount of service to entities 14 requesting service after an entity 14 receives the service the entity 14 has requested from the server 16.

The server 16 preferably includes a host 20 which writes desired traffic parameters for a virtual connection and the amount of requested bandwidth for the connection to the transmit scheduler 18. The server 16 preferably includes a host memory 22 for holding data packets 24 written by the host 20. The server 16 preferably includes a packet ready queue 24 for holding descriptors for the data packets 24 in the host memory 22.

Figure 2:
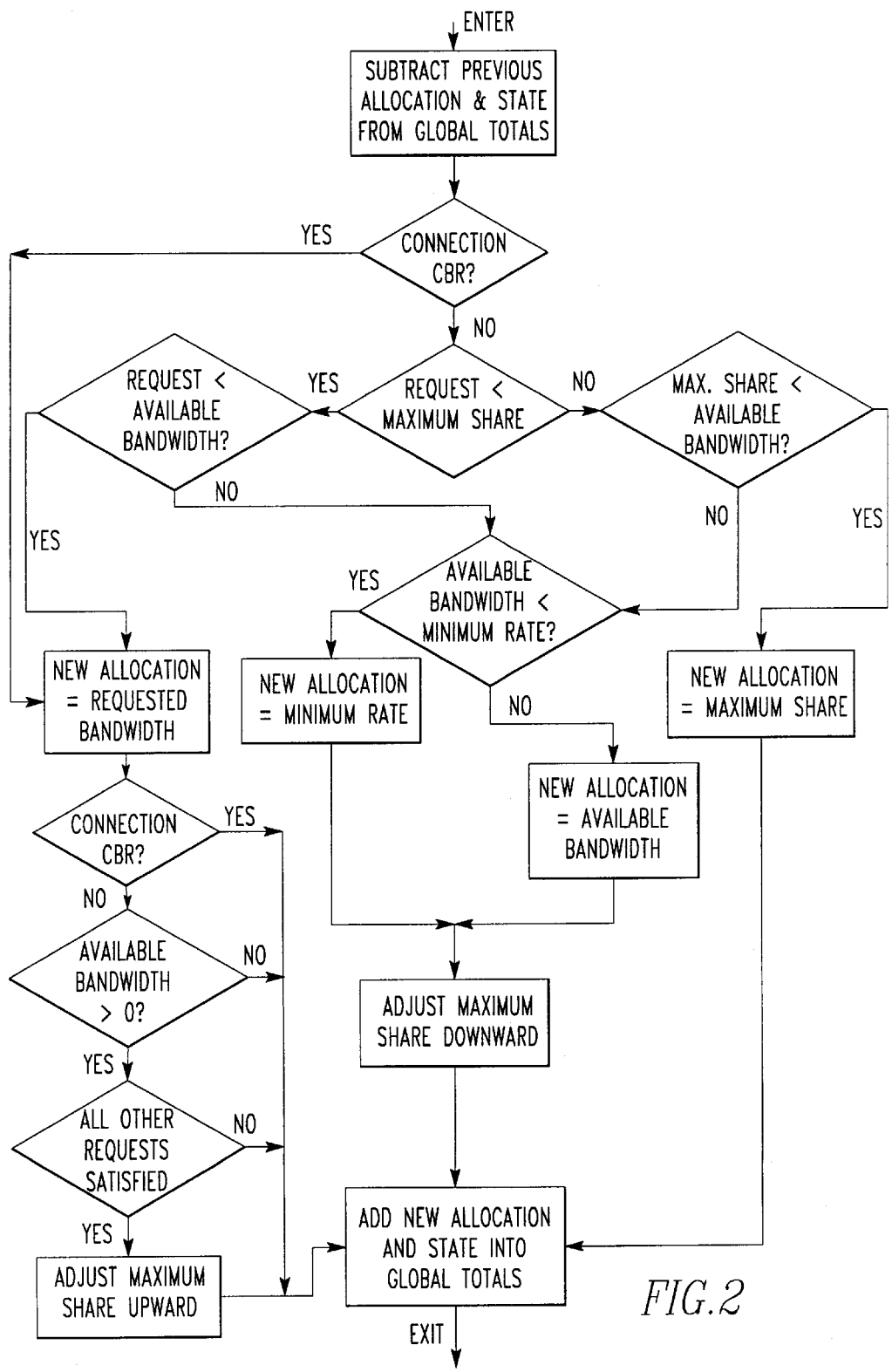
FIG. 2 is a flow chart of the algorithm of the present invention.

With reference to FIG. 2, the present invention pertains to a method for providing service to entities. The method comprises the steps of receiving first request for service by a server within a predetermined time from a first entity. Next there is the step of receiving a second request for service by the server within the predetermined time from a second entity. Then there is the step of reducing the service to be provided by the server to the first entity so the second entity can be provided service by the server within the predetermined time.

The reducing step preferably includes the step of reducing the service to be provided by the server to the first entity while the second entity is waiting for service so the second entity can be provided service by the server within the predetermined time. Preferably, after the receiving the first request step, there is the step of providing service by the server to the first entity. After the reducing step, there is preferably the step of providing service by the server to the second entity. Preferably, after the reducing step, there is the step of providing a reduced amount of service to the first entity. The producing step preferably includes the step of reducing the service to be provided by the server to the first entity so the server can provide service required of it by the second entity. After the providing reduced service to the first entity step, there is preferably the steps of receiving a request for service by the server from a third entity who has a priority status that entitles the third entity to receive as much service from the server as the third entity needs.

After the receiving a request for service from the third entity step, there are preferably the steps of providing by the server all the service requested of it by the third entry. Then there is the step of reducing the amount of service provided by the server to the first and second entities by an amount necessary to provide all the service by the server requested of it by the third entity.

Alternatively, after providing the reduced service to the first entity step, there are preferably the steps of receiving a request from a third entity for service by the server which requires an amount of service from the server which is less than a second maximum amount of service available from the server. Then there is the step of providing service to the third entity by the server without reducing the amount of service provided by the server to the first and second entities.

Alternatively, after the step of providing service to the second entity, there is the step of increasing the amount of service provided by the server to the first entity. Before the increasing step, there is preferably the step of making available service that was provided by the server to the second entity. After the making available step, there is preferably the step of determining that there are not other requests for service by the server from entities other than the first entity which have not been satisfied.

Alternatively, after the receiving the second request step, there is preferably the step of receiving a second request for service which is less than the maximum share of service available by the server for the second entity. The receiving the second request step then preferably includes the step of receiving a second request for service which is less than the service available by the server for the second entity. The providing service by the server to the second entity step preferably then includes the step of providing the same amount of service to the second entity as the service requested of the server by the second entity.

Alternatively, the receiving the second request step preferably includes the step of receiving a second request for service which is more than the service available by the server for the second entity. The second request step preferably then includes the steps of receiving a second request for service with a minimum rate which is less than the service available to the second entity by the server. The step of providing service to the second entity then preferably includes the step of providing the service to the second entity at the service available to the second entity by the server. The second request step preferably then also includes the step of adjusting a maximum share of service available to the second entity by the server downward.

Alternatively, the receiving the second request step preferably includes the steps of receiving a second request for service with a minimum rate which is more than the service available for the second entity by the server. The providing service by the server to the second entity step preferably then includes the step of providing service to the second entity in an amount equal to the minimum rate. The second requesting step then preferably includes the step of adjusting a maximum share of service available to the second entity by the server downward.

Alternatively, the receiving the second request step preferably includes the step of receiving a second request for service which is greater than the maximum share of service available by the server for a second entity. The receiving the second request step preferably then includes the step of receiving a second request for service from the second entity which has a maximum share of service which is greater than the service available by the server for the second entity. The providing service by the server to the second entity step preferably then includes the step of providing service to the second entity at a share equal to the service available.

Alternatively, the receiving the second request step includes the step of receiving a second request for service from the second entity which has a maximum share of service which is less than the service available by the server for the second entity. The providing service by the server to the second entity step preferably includes the step of providing service to the second entity equal to the maximum share of service available by the server for the second entity.

In the operation of the preferred embodiment, FIG. 1 illustrates how the implementation of the algorithm (the Bandwidth Allocator 20) is connected to the remainder of the system 10 and the attached Host 20. The Interfaces between blocks have been labeled.

The Host 20 begins transmission by first writing the desired traffic parameters for a Virtual Connection (VC) to the Transmit Scheduler 19 (Interface 1). The host 20 writes the value of the Requested Bandwidth (ACR) for the connection and the Service Category (SC) to the Transmit Scheduler 19. The Host 20 then writes one or more Data Packets 24 to host memory 22 and then queues one or more descriptors to the Packet Ready Queue 25. The information in queues on Interface 2 includes the address, length and VC for the Data Packet(s) 24 in host memory 22.

The Transmit Scheduler 18 pulls the information from the Packet Ready Queue 25 (Interface 3; the same data contents as on Interface 2). If the Transmit Scheduler 19 determines that the VC for the Data Packet 24 is not currently Active, then a request is made on Interface 4 with the following parameters:

Opcode: Set to FIRST
    ACRi+1: New value of ACR (requested bandwidth)
    MCR: Miminum Cell Rate for the connection.
    ACRi: Previous value of ACR
    NCRi: Previous value of NCR
    SC: Service Category for the connection (CBR, UBR or ABR)
    use_wmin: Per-VC state, set if the connection if the global NCR_min is to be a lower bound for the NCR for the connection.
    There is a single value returned on Interface 5:
    NCRi+1: Output of the bandwidth allocator Once the Transmit Scheduler 19 has the new NCR for the VC, the VC is set to segment cells at the rate NCR. At this rate, data is transferred from Data Packets 24 in host memory 22 (Interface 6) and sent to the ATM Network 26 as ATM Cells (Interface 7). The Transmit Scheduler 19 may request new allocations on Interface 4 by using the same arguments as listed before but using an Opcode parameter of CHANGE or FIXED. The Transmit Scheduler 19 may also give new values for ACRi+1 if the rate has changed due to feedback from the ATM Network 26. If a VC is to be deallocated, the Transmit Scheduler 18 sends a command on Interface 4 with an Opcode of DEALLOC.

Pseudocode

There are three service categories supported: CBR, ABR and UBR

CBR is distinguished in that the max-min algorithm is not applied to connections. Instead, the desired bandwidth is simply subtracted from TFB and allocate to the connection UBR traffic does not necessarily have the available TFB as its upper limit. Instead, if the use_wmin bit for the connection is set, then the minimum bandwidth for the connection is given by the WCR_MIN register. Although if value of WCR_MAX is less than WCR_MIN, then WCR_MAX is the ceiling for the assigned bandwidth.

ABR traffic has a guarantee in addition to those for UBR. If the rate of traffic for an ABR connection is less than or equal to TCR (Terminal Cell Rate), then the WCR for the connection is fixed to TCR. This rule ensure adequate scheduler bandwidth for ABR connections which are trying to reallocate rate from the network.

The bandwidth allocation for all connection is recalculated periodically for every "X" number of cells transmitted, and when the connection remains in the bandwidth deficit state (when the connection is not able to allocated at least WCR_max in bandwidth). The bandwidth allocator is also invoked when an inbound b-RM cell results in a rate change for an ABR connection.

Definitions for the bandwidth allocator algorithm are the following:

CFB: Current Free Bandwidth, in units of cells/second. Initialized to line rate.

BWmax: Maximum value for assignment of NCR. Initialized to Line Rate.
    BWinc: Additive increase for BW_max (comparable to the "e1" parameter in the white paper)
    BWdec: Additive decrease for BW_max (comparable to the "e2" parameter in the white paper)
    ACRi+1: New value of ACR (requested bandwidth)
    NCRi+1: Output of the bandwidth allocator
    MCR: Minimum Cell Rate for the connection.
    ACRi: Previous value of ACR
    NCRi: Previous value of NCR
    BRNS: Bandwidth Deficit Count, number of channels which cannot allocate BW_max due to limit in CFB
    MBRS: Per-connection flag which indicates connection was not able to allocate BW_max due to limits in CFB.
    BRSO: Bandwidth Requests Satisfied and Open. Number of active channels which have successfully allocated at least BW_max (comparable to the "m" parameter in the white paper).
    SC: Service Category for the connection (CBR, UBR or ABR)

New Parameters for implementation:

opcode: Argument passed into algorithm describing the type of operation:
        FIRST: First bandwidth request for the connection
        UPDATE: Request new NCR for a previously allocated connection.
        DEALLOC: Completely deallocate the connection's allocated bandwidth
        FIXED: Fix the allocated bandwidth to the requested bandwidth
    use_wmin: Per-VC state, set if the connection if the global NCR_min is to be a lower bound for the NCR for the connection.
    nailed_acr: State local to bandwidth allocation routine, indicates ACR for ABR connection was adjusted up to TCR.
    TCR: Terminal Cell Rate for ABR connections.
    BW_ceil: Upper ceiling for BW_max. Initialized to Line Rate.
    NCR_min: Selective minimum value for NCR.
    var_BWinc: Flag which indicates variable mode is used for increase of BW_max.
    var_BWdec: Flag which indicated variable mode is used for decrease of BW_max.

Following is the pseudocode algorithm for bandwidth allocation of UBR, ABR and CBR:

```
/* If connection is already established (not first update), then add the
 * connection's nominal cell rate back to the Current Free Bandwidth
 */
if (opcode != FIRST)
    CFB += NCRi;
/*
 * If the connection is ABR, it is a regular rate update and the Allowed
 * Cell Rate is less than TCR, then fix the new ACR to TCR and set the
 * Nailed_ACR flag.
 */
if ((opcode != FIXED) && (SC == ABR) && (ACRi+1 <= TCR)) {
    ACRi+1 = TCR;
    nailed_acr = TRUE;
} else {
    nailed_acr = FALSE;
}
```

```
/* If the connection is CBR, then allocated the connection its requested
 * bandwidth unconditionally. Otherwise, set the initial ceiling for the
 * connection's allocated bandwidth to BW_max.
 */
if (SC == CBR)
   NCRi+1 = ACRi+1;
else
   NCR_max = min(ACRi+1, BW_max);
/* Update the MBRS flag for the connection as well as the
 * BRNS and BRSO counts
 */
if (opcode == DEALLOC) {
      if (MBRS) {
          BRNS -= 1;
          MBRS = FALSE;
      }
}
elseif (NCR_max > CFB) {
      NCR_max = CFB;
      if (MBRS != TRUE) {
          BRNS += 1;
          MBRS = TRUE;
      }
}
else {
      if (MBRS == TRUE) {
          BRNS -= 1;
          MBRS = FALSE;
      }
}
if (opcode == DEALLOC) {
      if (MBRS == 0)
          BRSO -= 1;
}
else if (opcode == FIRST) {
      if (!(NCR_max > CFB))
          BRSO += 1;
}
else if (NCR_max > CFB) {
      if (MBRS == 0)
          BRSO -= 1;
}
else {
      if (MBRS == 1) {
          BRSO += 1;
      }
}
/* Allocate bandwidth for the connection. If the connection is deallocated,
 * the set the bandwidth to zero. If the ACR for the connection is nailed
 * down, then allocate TCR. If the rate is fixed or if the connection is
 CBR,
 * then allocate the requested rate. If the use_wmin flag is set, use
 * NCR_min as a lower bound for the connection (unless BW_max
 * is less than NCR_min, in which case BW_max is the lower bound.
 * If the allocated rate is less than MSC, then allocate MCR
 */
if (opcode == DEALLOC) {
  NCRi+1 = 0;
  frm_oor_mode = FALSE;
}
else if (nailed_acr) {
  NCRi+1 = TCR;
  frm_oor_mode = TRUE;
}
else if ((opcode == FIXED) || (SC == CBR)) {
  NCRi+1 = ACRi+1;
  frm_oor_mode = FALSE;
}
else if (use_wmin) {
  if (NCR_min < BW_max) {
    NCR_lim = NCR_min;
  else {
    NCR_lim = BW_max;
  }
  if (NCR_max < NCR_lim) {
    if (ACRi+1 > NCR_lim) {
        NCRi+1 = NCR_lim;
    } else {
        NCRi+1 = ACRi+1;
```

```
      }
   }
   else {
      NCRi+1 = NCR_max;
   }
   frm_oor_mode = FALSE;
} else if (NCR_max < MCR) {
   NCRi+1 = MCR;
   frm_oor_mode = FALSE;
} else {
   NCRi+1 = NCR_max;
}
/* Finally, subtract the allocated rate from the Current Free Bandwidth */
CFB -= NCRi+1
```

Before leaving the bandwidth allocation routine, the value of BW_max is adjusted:

```
shift = floor(log2(BRSO));
BW_inc_tmp = CFB >> shift;
BW_dec_tmp = (BW_max - NCRi+1) >> shift;
if ((BW_inc_tmp > BW_inc) || (!var_BWinc)) {
   BW_inc_tmp = BW_inc;
}
if ((BW_dec_tmp > BW_dec) || (!var_BWdec)) {
   BW_dec_tmp = BW_dec;
}
if ((CFB > 0) and (BRNS == 0)) {
   BW_max += BW_inc_tmp;
}
else if (MBRS) { /* flag is for the current connection */
   BW_max -= BW_dec_tmp;
}
else {
   BW_max = BW_max;}
if (BW_max > BW_ceil) {
   BW_max = BW_ceil;
}
```

If the current CFB value is positive and the bandwidth deficit count is zero, then BW_max is increased. Else if the bandwidth deficit flag for the connection being serviced is set, then BW_max is decremented. Otherwise, BW_max remains the same. BW_max cannot be increased above the limit imposed by BW_ceil.

The var_BWinc and var_BWdec flags control the operating mode for the BW_max increase and decrease amounts. If either flag is set, the corresponding delta for BW_max is proportional with to the number of active connections which have a NCR of at least BW_max.

Algorithm Operation Example

For the pseudocode presented above, let's observe the algorithm in operation using the following connections:

VC #1: UBR connection, ACR=600 Mbps, use_wmin= TRUE

VC #2: UBR connection, ACR=600 Mbps, use_wmin= TRUE

VC #3: UBR connection, ACR=100 Mbps, use_wmin= TRUE

VC #4: CBR connection, ACR=50 Mbps

VC #5: ABR connection, ACR initially is 500 Mbps (reduced later), use_wmin=FALSE, MCR=9.37 Mbps The VC's are allocated over the course of the run, rescheduled on occasion, then deallocated before the end of the run. The initial global parameters for the algorithm are:

Line_Rate=600 Mbps (megabits per second)

CFB=Line_Rate

BW_max=BW_ceil=Line_Rate

NCR_min=Line_Rate/600 Mbps=18.75 Mbps
BW_inc=BW_dec=Link_Rate/8=75 Mbps
var_BWinc=var_BWdec=TRUE
BRNS=BRSO=0
NCR and MBRS for each connection is zero Table A below shows the sequence of operations which are sent to the bandwidth allocator (indexed by Operation Number). The Operation Type is either ALLOC (allocate new connections), RESCH (rescheduled existing connection), FIXED (schedule connection at fixed NCR= ACR), or DEALC (deallocate bandwidth for connection). The VCI associated with the operation is listed along with its current ACR and the new NCR value assigned for the VC by the allocator. It also lists the change if any in the per-VC MBRS state. To the right of the dark bar in the table is the current global state for the bandwidth allocator: the BRNS and BRSO counts, the BW_max limit, and CFB (Current Free Bandwidth).

Some of the highlights of the operation example are:

At op#1, VC #1 is allocated 600 Mbps of the Line Rate

At op#4, VC #2 is allocated the NCR_min value (18.75 Mbps)

By op#12, the BW_max threshold has been reduced to 300 Mbps, and VC#1 and VC#2 are sharing the Link Rate equally.

At op #13, VC #3 is allocated NCR_min (18.75 Mbps)

By op#22, the BW_max has been reduce to 250 Mbps so that VC #3 has all 100 Mbps of its requested bandwidth, and VC #1 and #2 share the remaining 500 Mbps equally, At op#26, CBR connection VC #4 is allocated its ACR of 50 Mbps immediately.

By op#32, the BW_max threshold has been reduced so that VC #3 and #4 have their requested bandwidths (150 Mbps combined), while connections VC #1 and #2 share the remaining 450 Mbps equally.

At op#35, VC #2 is deallocated. By op#39, VC #1 has claimed all of the bandwidth freed by the deallocation (NCR for VC #1 now 450 Mbps)

At op#54, ABR connection VC #5 is allocated its MCR of 9.375 Mbps.

By op#66, VC #1 and #5 are sharing the available bandwidth of 550 Mbps (50 Mbps is still allocated to CBR connection #3).

At op#68, VC #5 reduces its NCR to 100 Mbps. By op#71, VC #1 has reclaimed the bandwidth freed by VC #5.

At op#76, VC #5 reduces its rate to 1 cell/sec (0.000424 Mbps). Since the TCR (Terminal Cell Rate) for an ABR connection is 10 cells/sec, the NCR for the connection is fixed to 0.00424 Mbps.

By op#79, VC #1 has reclaimed the bandwidth freed by VC #5, increasing its NCR to 550 Mbps.

At op#81, VC #5 fixed its rate to 50 Mbps. By op#86, VC #1 has reduced its rate to 500 Mbps (with VC #5 has 50 Mbps and VC #4 at 50 Mbps).

During op#89 to 93, VC #5 deallocates its bandwidth, then VC #4. In both cases, VC #1 reclaims the freed bandwidth.

At op#96, VC #1 deallocated. CFB returns to its initial value of 600 Mbps and BRNS and BRSO return to zero.

TABLE A

| Operation Number | Operation Type | VCI | ACR (Mbps) | $NCR_{i+1}$ (Mbps) | Change in MBRS | BRNS | BRSO | BW_max (Mbps) | CFB (Mbps) |
|---|---|---|---|---|---|---|---|---|---|
| 1 | ALLOC | 1 | 600 | 600 | 0->0 | 0 | 1 | 600 | 0 |
| 2 | RESCH | 1 | 600 | 600 | 0->0 | 0 | 1 | 600 | 0 |
| 3 | RESCH | 1 | 600 | 600 | 0->0 | 0 | 1 | 600 | 0 |
| 4 | ALLOC | 2 | 600 | 18.7 | 0->1 | 1 | 1 | 525 | -18.7 |
| 5 | RESCH | 1 | 600 | 525 | 0->0 | 1 | 1 | 525 | 56.2 |
| 6 | RESCH | 2 | 600 | 75 | 1->1 | 1 | 1 | 450 | 0 |
| 7 | RESCH | 1 | 600 | 450 | 0->0 | 1 | 1 | 450 | 75 |
| 8 | RESCH | 2 | 600 | 150 | 1->1 | 1 | 1 | 375 | 0 |
| 9 | RESCH | 1 | 600 | 375 | 0->0 | 1 | 1 | 375 | 75 |
| 10 | RESCH | 2 | 600 | 225 | 1->1 | 1 | 1 | 300 | 0 |
| 11 | RESCH | 1 | 600 | 300 | 0->0 | 1 | 1 | 300 | 75 |
| 12 | RESCH | 2 | 600 | 300 | 1->0 | 0 | 2 | 300 | 0 |
| 13 | ALLOC | 3 | 100 | 18.7 | 0->1 | 1 | 2 | 225 | -18.7 |
| 14 | RESCH | 1 | 600 | 225 | 0->0 | 1 | 2 | 225 | 56.2 |
| 15 | RESCH | 2 | 600 | 225 | 0->0 | 1 | 2 | 225 | 131 |
| 16 | RESCH | 3 | 100 | 100 | 1->0 | 0 | 3 | 250 | 50 |
| 17 | RESCH | 1 | 600 | 250 | 0->0 | 0 | 3 | 262 | 25 |
| 18 | RESCH | 2 | 600 | 250 | 0->1 | 1 | 2 | 256 | 0 |
| 19 | RESCH | 3 | 100 | 100 | 0->0 | 1 | 2 | 256 | 0 |
| 20 | RESCH | 1 | 600 | 250 | 0->1 | 2 | 1 | 250 | 0 |
| 21 | RESCH | 2 | 600 | 250 | 1->0 | 1 | 2 | 250 | 0.000424 |
| 22 | RESCH | 3 | 100 | 100 | 0->0 | 1 | 2 | 250 | 0.000424 |
| 23 | RESCH | 1 | 600 | 250 | 1->0 | 0 | 3 | 250 | 0.000424 |
| 24 | RESCH | 2 | 600 | 250 | 0->0 | 0 | 3 | 250 | 0.000424 |
| 25 | RESCH | 3 | 100 | 100 | 0->0 | 0 | 3 | 250 | 0.000424 |
| 26 | ALLOC | 4 | 50 | 50 | 0->0 | 0 | 3 | 250 | -50 |
| 27 | RESCH | 1 | 600 | 200 | 0->1 | 1 | 2 | 225 | 0 |
| 28 | RESCH | 2 | 600 | 225 | 0->0 | 1 | 2 | 225 | 25 |
| 29 | RESCH | 3 | 100 | 100 | 0->0 | 1 | 2 | 225 | 25 |
| 30 | RESCH | 4 | 50 | 50 | 0->0 | 1 | 2 | 225 | 25 |
| 31 | RESCH | 1 | 600 | 225 | 1->1 | 1 | 2 | 225 | 0 |
| 32 | RESCH | 2 | 600 | 225 | 0->0 | 1 | 2 | 225 | 0 |

TABLE A-continued

| Operation Number | Operation Type | VCI | ACR (Mbps) | NCR$_{i+1}$ (Mbps) | Change in MBRS | BRNS | BRSO | BW_max (Mbps) | CFB (Mbps) |
|---|---|---|---|---|---|---|---|---|---|
| 33 | RESCH | 3 | 100 | 100 | 0->0 | 1 | 2 | 225 | 0 |
| 34 | RESCH | 4 | 50 | 50 | 0->0 | 1 | 2 | 225 | 0 |
| 35 | DEALC | 2 | 600 | 0 | 0->0 | 1 | 1 | 225 | 225 |
| 36 | RESCH | 1 | 600 | 225 | 1->0 | 0 | 2 | 300 | 225 |
| 37 | RESCH | 3 | 100 | 100 | 0->0 | 0 | 2 | 375 | 225 |
| 38 | RESCH | 4 | 50 | 50 | 0->0 | 0 | 2 | 450 | 225 |
| 39 | RESCH | 1 | 600 | 450 | 0->0 | 0 | 2 | 450 | 0 |
| 40 | RESCH | 3 | 100 | 100 | 0->0 | 0 | 2 | 450 | 0 |
| 41 | RESCH | 4 | 50 | 50 | 0->0 | 0 | 2 | 450 | 0 |
| 42 | RESCH | 1 | 600 | 450 | 0->0 | 0 | 2 | 450 | 0 |
| 43 | RESCH | 3 | 100 | 100 | 0->0 | 0 | 2 | 450 | 0 |
| 44 | RESCH | 4 | 50 | 50 | 0->0 | 0 | 2 | 450 | 0 |
| 45 | RESCH | 1 | 600 | 450 | 0->0 | 0 | 2 | 450 | 0 |
| 46 | RESCH | 3 | 100 | 100 | 0->0 | 0 | 2 | 450 | 0 |
| 47 | RESCH | 4 | 50 | 50 | 0->0 | 0 | 2 | 450 | 0 |
| 48 | DEALC | 3 | 100 | 0 | 0->0 | 0 | 1 | 525 | 100 |
| 49 | RESCH | 1 | 600 | 525 | 0->0 | 0 | 1 | 550 | 25 |
| 50 | RESCH | 1 | 600 | 550 | 0->0 | 0 | 1 | 550 | 0 |
| 51 | RESCH | 1 | 600 | 550 | 0->0 | 0 | 1 | 550 | 0 |
| 52 | RESCH | 1 | 600 | 550 | 0->0 | 0 | 1 | 550 | 0 |
| 53 | RESCH | 1 | 600 | 550 | 0->0 | 0 | 1 | 550 | 0 |
| 54 | ALLOC | 5 | 500 | 9.37 | 0->1 | 1 | 1 | 475 | -9.37 |
| 55 | RESCH | 1 | 600 | 475 | 0->0 | 1 | 1 | 475 | 65.6 |
| 56 | RESCH | 5 | 500 | 75 | 1->1 | 1 | 1 | 400 | 0 |
| 57 | RESCH | 1 | 600 | 400 | 0->0 | 1 | 1 | 400 | 75 |
| 58 | RESCH | 5 | 500 | 150 | 1->1 | 1 | 1 | 325 | 0 |
| 59 | RESCH | 1 | 600 | 325 | 0->0 | 1 | 1 | 325 | 75 |
| 60 | RESCH | 5 | 500 | 225 | 1->1 | 1 | 1 | 250 | 0 |
| 61 | RESCH | 1 | 600 | 250 | 0->0 | 1 | 1 | 250 | 75 |
| 62 | RESCH | 5 | 500 | 250 | 1->0 | 0 | 2 | 275 | 50 |
| 63 | RESCH | 1 | 600 | 275 | 0->0 | 0 | 2 | 287 | 25 |
| 64 | RESCH | 5 | 500 | 275 | 0->1 | 1 | 1 | 275 | 0 |
| 65 | RESCH | 1 | 600 | 275 | 0->0 | 1 | 1 | 275 | 0 |
| 66 | RESCH | 5 | 500 | 275 | 1->0 | 0 | 2 | 275 | 0 |
| 67 | RESCH | 1 | 600 | 275 | 0->0 | 0 | 2 | 275 | 0 |
| 68 | RESCH | 5 | 100 | 100 | 0->0 | 0 | 2 | 350 | 175 |
| 69 | RESCH | 1 | 600 | 350 | 0->0 | 0 | 2 | 400 | 100 |
| 70 | RESCH | 5 | 100 | 100 | 0->0 | 0 | 2 | 450 | 100 |
| 71 | RESCH | 1 | 600 | 450 | 0->0 | 0 | 2 | 450 | 0 |
| 72 | RESCH | 5 | 100 | 100 | 0->0 | 0 | 2 | 450 | 0 |
| 73 | RESCH | 1 | 600 | 450 | 0->0 | 0 | 2 | 450 | 0 |
| 74 | RESCH | 5 | 100 | 100 | 0->0 | 0 | 2 | 450 | 0 |
| 75 | RESCH | 1 | 600 | 450 | 0->0 | 0 | 2 | 450 | 0 |
| 76 | RESCH | 5 | 0.000424 | 0.00424 | 0->0 | 0 | 2 | 500 | 100 |
| 77 | RESCH | 1 | 600 | 500 | 0->0 | 0 | 2 | 525 | 50 |
| 78 | RESCH | 5 | 0.000424 | 0.00424 | 0->0 | 0 | 2 | 550 | 50 |
| 79 | RESCH | 1 | 600 | 550 | 0->0 | 0 | 2 | 550 | 0 |
| 80 | RESCH | 5 | 0.000424 | 0.00424 | 0->0 | 0 | 2 | 550 | 0 |
| 81 | FIXED | 5 | 50 | 50 | 0->1 | 1 | 1 | 475 | -50 |
| 82 | RESCH | 1 | 600 | 475 | 0->0 | 1 | 1 | 475 | 25 |
| 83 | FIXED | 5 | 50 | 50 | 1->0 | 0 | 2 | 487 | 25 |
| 84 | RESCH | 1 | 600 | 487 | 0->0 | 0 | 2 | 494 | 12.5 |
| 85 | FIXED | 5 | 50 | 50 | 0->0 | 0 | 2 | 500 | 12.5 |
| 86 | RESCH | 1 | 600 | 500 | 0->0 | 0 | 2 | 500 | 0.000424 |
| 87 | FIXED | 5 | 50 | 50 | 0->0 | 0 | 2 | 500 | 0.000424 |
| 88 | RESCH | 1 | 600 | 500 | 0->0 | 0 | 2 | 500 | 0.000424 |
| 89 | DEALC | 5 | 50 | 0 | 0->0 | 0 | 1 | 550 | 50 |
| 90 | RESCH | 1 | 600 | 550 | 0->0 | 0 | 1 | 550 | 0 |
| 91 | RESCH | 1 | 600 | 550 | 0->0 | 0 | 1 | 550 | 0 |
| 92 | RESCH | 1 | 600 | 550 | 0->0 | 0 | 1 | 550 | 0 |
| 93 | DEALC | 4 | 50 | 0 | 0->0 | 0 | 1 | 600 | 50 |
| 94 | RESCH | 1 | 600 | 600 | 0->0 | 0 | 1 | 600 | 0 |
| 95 | RESCH | 1 | 600 | 600 | 0->0 | 0 | 1 | 600 | 0 |
| 96 | DEALC | 1 | 600 | 0 | 0->0 | 0 | 0 | 600 | 600 |

To further describe the algorithm in its various forms, additional examples are provided. The first is a comparison of the results from the use of various allocation schemes, and the other is the output of a sample simulation run.

TABLE B

| | Actual Bandwidth Received | | | | | | | | | | | |
|---|---|---|---|---|---|---|---|---|---|---|---|---|
| Algorithm | VC 1 | VC 2 | VC 3 | VC 4 | VC 5 | VC 6 | VC 7 | VC 8 | VC 9 | VC 10 | FAIRNESS | WASTED |
| Proportional | 93.02 | 93.02 | 93.02 | 93.02 | 5.81 | 5.81 | 5.81 | 5.81 | 2.33 | 2.33 | 23.26 | 0.00 |
| Round-Robin | 40.00 | 40.00 | 40.00 | 40.00 | 40.00 | 40.00 | 40.00 | 40.00 | 40.00 | 40.00 | 39.81 | 30.00 |
| Max-Min Fair | 70.00 | 70.00 | 70.00 | 70.00 | 25.00 | 25.00 | 25.00 | 25.00 | 10.00 | 10.00 | 49.80 | 0.00 |
| Requested | 400 | 400 | 400 | 400 | 25 | 25 | 25 | 25 | 10 | 10 | | |

Table B gives a sample set of connections among whom bandwidth needs to be divided. For purposes of the example, the total bandwidth available is 400 and the bandwidth request by each virtual connection (VC) is listed in the table at the very bottom. The last two columns of the table give the fairness metric for each algorithm and the amount of bandwidth that went unused due to the algorithm assigning more bandwidth than was requested. The fairness metric is calculated by dividing the granted bandwidth by the requested bandwidth for each VC, with a maximum value of 1.00, and then calculating the geometric mean (the geometric mean of a set of n values is calculated by taking the $n^{th}$ root of the product of the n values) of the 10 values.

The first row of Table B represents proportional allocation. If the sum of the requested bandwidths is less than the link rate, each connection is assigned its requested bandwidth. In the case of oversubscription, i.e. the total is more than the link rate, each connection is assigned its requested bandwidth scaled down by the ration of the link rate divided by the total requested bandwidth. This allocation scheme is not always explicitly implemented. By always granting the requested rate and enforcing a maximum aggregate rate, proportional allocation can be done implicitly. One such mechanism is weighted round-robin queuing where connections of each bandwidth are grouped and the groups are served with a frequency proportional to their rate. The second row is the allocation resulting from a pure round robing service. Each connection gets an equal portion of the link rate, regardless of requested bandwidth in contrast to weighted round robin which takes the relative rates into account. Lastly, the max-min fair allocation is shown in the last row.

The proportional allocation makes full use of the available bandwidth, but it has one major disadvantage. Once oversubscription occurs, not a single connection, no matter how small its request, gets the full amount for which it asked. This causes a poor fairness metric for this scheme especially in cases where the oversubscription is by a significant amount.

Pure round robin can give a wide variety of fairness and wasted bandwidth results. In this example, since a number of connections had requested bandwidth less than 1/10 the link rate, they received their request (and more) which improved the fairness metric by more than 70% over proportional allocation. However, since those same connections that improved the fairness were actually requesting less than 1/10 of the link rate, there is a substantial amount of unused bandwidth.

The max-min scheme satisfies the lower requests like the round robin, but it does not waste the bandwidth. The combination of the two yields the highest fairness metric value and maintains zero wasted bandwidth.

The sample run of the simulator is found in the Appendix. The output represents the first 50 cell times of a SAR whose transmitter is using the max-min algorithm. Although the algorithm does not reach the true steady state until roughly cell time 100, the allocation of bandwidth has reached the point where no connection is more than 6.5% off from its steady state allocation.

The situation being simulated is as follows: 4 connections, number 0, 3, 5 and 7) are low priority (UBR) connections requesting the full link rate of 353207 cells per second; connection 2 is a high priority (CBR) connection requesting 20% of the link (70640 cells/second); and the other three connections (numbers 1, 4 and 6) are also CBR connections, but with requests of 10% (35320 cells/second) each. The high priority connections should each receive exactly their requested bandwidth once the connection is opened, and in the steady state the low priority connections should each receive 12.5% of the link rate or 44150 cells/second.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

APPENDIX

```
Cell Time: 0 unhappy=0 CFB=353207.00 MRV=2 BWmax=     0.00
    VCI/VPI= 0 CCR=        0.00 ACR =    0.00 PCR=353207.00
    VCI/VPI= 1 CCR=        0.00 ACR =    0.00 PCR= 35320.00
    VCI/VPI= 2 CCR=        0.00 ACR =    0.00 PCR= 70640.00
    VCI/VPI= 3 CCR=        0.00 ACR =    0.00 PCR=353207.00
    VCI/VPI= 4 CCR=        0.00 ACR =    0.00 PCR= 35320.00
    VCI/VPI= 5 CCR=        0.00 ACR =    0.00 PCR=353207.00
    VCI/VPI= 6 CCR=        0.00 ACR =    0.00 PCR= 35320.00
    VCI/VPI= 7 CCR=        0.00 ACR =    0.00 PCR=353207.00
Cell Time: 1 unhappy=0 CFB=156980.89 MRV=2 BWmax=196226.11
    VCI/VPI= 0 CCR=196226.11 ACR=    0.00 PCR=353207.00
    VCI/VPI= 1 CCR=        0.00 ACR=    0.00 PCR= 35320.00
    VCI/VPI= 2 CCR=        0.00 ACR=    0.00 PCR= 70640.00
    VCI/VPI= 3 CCR=        0.00 ACR=    0.00 PCR=353207.00
    VCI/VPI= 4 CCR=        0.00 ACR=    0.00 PCR= 35320.00
    VCI/VPI= 5 CCR=        0.00 ACR=    0.00 PCR=353207.00
    VCI/VPI= 6 CCR=        0.00 ACR=    0.00 PCR= 35320.00
    VCI/VPI= 7 CCR=        0.00 ACR=    0.00 PCR=353207.00
Cell Time: 2 unhappy=0 CFB=121660.89 MRV=2 BWmax=196226.11
    VCI/VPI= 0 CCR=196226.11 ACR=    0.00 PCR=353207.00
    VCI/VPI= 1 CCR= 35320.00 ACR=    0.00 PCR= 35320.00
    VCI/VPI= 2 CCR=        0.00 ACR=    0.00 PCR= 70640.00
    VCI/VPI= 3 CCR=        0.00 ACR=    0.00 PCR=353207.00
    VCI/VPI= 4 CCR=        0.00 ACR=    0.00 PCR= 35320.00
    VCI/VPI= 5 CCR=        0.00 ACR=    0.00 PCR=353207.00
    VCI/VPI= 6 CCR=        0.00 ACR=    0.00 PCR= 35320.00
    VCI/VPI= 7 CCR=        0.00 ACR=    0.00 PCR=353207.00
Cell Time: 3 unhappy=0 CFB=51020.89 MRV=2 BWmax=196226.11
    VCI/VPI= 0 CCR=196226.11 ACR=    0.00 PCR=353207.00
    VCI/VPI= 1 CCR= 35320.00 ACR=    0.00 PCR= 35320.00
    VCI/VPI= 2 CCR= 70640.00 ACR=    0.00 PCR= 70640.00
    VCI/VPI= 3 CCR=        0.00 ACR=    0.00 PCR=353207.00
    VCI/VPI= 4 CCR=        0.00 ACR=    0.00 PCR= 35320.00
    VCI/VPI= 5 CCR=        0.00 ACR=    0.00 PCR=353207.00
    VCI/VPI= 6 CCR=        0.00 ACR=    0.00 PCR= 35320.00
    VCI/VPI= 7 CCR=        0.00 ACR=    0.00 PCR=353207.00
Cell Time: 4 unhappy=1 CFB=     0.00 MRV=2 BWmax=159162.34
```

APPENDIX-continued

```
         VCI/VPI= 0 CCR=196226.11 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 51020.89 ACR=    0.00 PCR=353207.00
         VCI/VPI= 4 CCR=     0.00 ACR=    0.00 PCR= 35320.00
         VCI/VPI= 5 CCR=     0.00 ACR=    0.00 PCR=353207.00
         VCI/VPI= 6 CCR=     0.00 ACR=    0.00 PCR= 35320.00
         VCI/VPI= 7 CCR=     0.00 ACR=    0.00 PCR=353207.00
Cell Time: 5 unhappy=1 CFB=-35320.00 MRV=2 BWmax=159162.34
         VCI/VPI= 0 CCR=196226.11 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 51020.89 ACR=    0.00 PCR=353207.00
         VCI/VPI= 4 CCR= 35320.00 ACR=    0.00 PCR= 35320.00
         VCI/VPI= 5 CCR=     0.00 ACR=    0.00 PCR=353207.00
         VCI/VPI= 6 CCR=     0.00 ACR=    0.00 PCR= 35320.00
         VCI/VPI= 7 CCR=     0.00 ACR=    0.00 PCR=353207.00
Cell Time: 6 unhappy=2 CFB=-35320.00 MRV 2 BWmax=106108.23
         VCI/VPI= 0 CCR=196226.11 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 51020.89 ACR=    0.00 PCR=353207.00
         VCI/VPI= 4 CCR= 35320.00 ACR=    0.00 PCR= 35320.00
         VCI/VPI= 5 CCR=     0.00 ACR=    0.00 PCR=353207.00
         VCI/VPI= 6 CCR=     0.00 ACR=    0.00 PCR= 35320.00
         VCI/VPI= 7 CCR=     0.00 ACR=    0.00 PCR=353207.00
Cell Time: 7 unhappy=2 CFB=-70640.00 MRV=2 BWmax=106108.23
         VCI/VPI= 0 CCR=196226.11 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 51020.89 ACR=    0.00 PCR=353207.00
         VCI/VPI= 4 CCR= 35320.00 ACR=    0.00 PCR= 35320.00
         VCI/VPI= 5 CCR=     0.00 ACR=    0.00 PCR=353207.00
         VCI/VPI= 6 CCR= 35320.00 ACR=    0.00 PCR= 35320.00
         VCI/VPI= 7 CCR=     0.00 ACR=    0.00 PCR=353207.00
Cell Time: 8 unhappy=3 CFB=-70640.00 MRV=2 BWmax= 70738.83
         VCI/VPI= 0 CCR=196226.11 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 51020.89 ACR=    0.00 PCR=353207.00
         VCI/VPI= 4 CCR= 35320.00 ACR=    0.00 PCR= 35320.00
         VCI/VPI= 5 CCR=     0.00 ACR=    0.00 PCR=353207.00
         VCI/VPI= 6 CCR= 35320.00 ACR=    0.00 PCR= 35320.00
         VCI/VPI= 7 CCR=     0.00 ACR=    0.00 PCR=353207.00
Cell Time: 9 unhappy=3 CFB=-70640.00 MRV=2 BWmax= 70738.83
         VCI/VPI= 0 CCR=196226.11 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 51020.89 ACR=    0.00 PCR=353207.00
         VCI/VPI= 4 CCR= 35320.00 ACR=    0.00 PCR= 35320.00
         VCI/VPI= 5 CCR=     0.00 ACR=    0.00 PCR=353207.00
         VCI/VPI= 6 CCR= 35320.00 ACR=    0.00 PCR= 35320.00
         VCI/VPI= 7 CCR=     0.00 ACR=    0.00 PCR=353207.00
Cell Time: 10 unhappy=3 CFB=-70640.00 MRV=2 BWmax= 70738.83
         VCI/VPI= 0 CCR=196226.11 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 51020.89 ACR=    0.00 PCR=353207.00
         VCI/VPI= 4 CCR= 35320.00 ACR=    0.00 PCR= 35320.00
         VCI/VPI= 5 CCR=     0.00 ACR=    0.00 PCR=353207.00
         VCI/VPI= 6 CCR= 35320.00 ACR=    0.00 PCR= 35320.00
         VCI/VPI= 7 CCR=     0.00 ACR=    0.00 PCR=353207.00
Cell Time: 11 unhappy=3 CFB= 54847.28 MRV=2 BWmax= 70738.83
         VCI/VPI= 0 CCR= 70738.83 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 51020.89 ACR=    0.00 PCR=353207.00
         VCI/VPI= 4 CCR= 35320.00 ACR=    0.00 PCR= 35320.00
         VCI/VPI= 5 CCR=     0.00 ACR=    0.00 PCR=353207.00
         VCI/VPI= 6 CCR= 35320.00 ACR=    0.00 PCR= 35320.00
         VCI/VPI= 7 CCR=     0.00 ACR=    0.00 PCR=353207.00
Cell Time: 12 unhappy=2 CFB= 35129.34  =  70738.83
         VCI/VPI= 0 CCR= 70738.83 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 70738.83 ACR=    0.00 PCR=353207.00
         VCI/VPI= 4 CCR= 35320.00 ACR=    0.00 PCR= 35320.00
         VCI/VPI= 5 CCR=     0.00 ACR=    0.00 PCR=353207.00
         VCI/VPI= 6 CCR= 35320.00 ACR=    0.00 PCR= 35320.00
         VCI/VPI= 7 CCR=     0.00 ACR=    0.00 PCR=353207.00
Cell Time: 13 unhappy=2 CFB=    0.00 MRV=2 BWmax= 58569.00
         VCI/VPI= 0 CCR= 70738.83 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 70738.83 ACR=    0.00 PCR=353207.00
         VCI/VPI= 4 CCR= 35320.00 ACR=    0.00 PCR= 35320.00
         VCI/VPI= 5 CCR= 35129.34 ACR=    0.00 PCR=353207.00
         VCI/VPI= 6 CCR= 35320.00 ACR=    0.00 PCR= 35320.00
         VCI/VPI= 7 CCR=     0.00 ACR=    0.00 PCR=353207.00
Cell Time: 14 unhappy=2 CFB=    0.00 MRV=2 BWmax=58869.00
         VCI/VPI= 0 CCR= 70738.83 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 70738.83 ACR=    0.00 PCR=353207.00
         VCI/VPI= 4 CCR= 35320.00 ACR=    0.00 PCR= 35320.00
         VCI/VPI= 5 CCR= 35129.34 ACR=    0.00 PCR=353207.00
         VCI/VPI= 6 CCR= 35320.00 ACR=    0.00 PCR= 35320.00
         VCI/VPI= 7 CCR=     0.00 ACR=    0.00 PCR=353207.00
Cell Time: 15 unhappy=2 CFB=    0.00 MRV=2 BWmax= 58869.00
         VCI/VPI= 0 CCR= 70738.83 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 70738.83 ACR=    0.00 PCR=353207.00
         VCI/VPI= 4 CCR= 35320.00 ACR=    0.00 PCR= 35320.00
         VCI/VPI= 5 CCR= 35129.34 ACR=    0.00 PCR=353207.00
         VCI/VPI= 6 CCR= 35320.00 ACR=    0.00 PCR= 35320.00
         VCI/VPI= 7 CCR=     0.00 ACR=    0.00 PCR=353207.00
Cell Time: 16 unhappy=2 CFB= 11869.83 MRV=2 BWmax= 58869.00
         VCI/VPI= 0 CCR= 58869.00 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 70738.83 ACR=    0.00 PCR=353207.00
         VCI/VPI= 4 CCR= 35320.00 ACR=    0.00 PCR= 35320.00
         VCI/VPI= 5 CCR= 35129.34 ACR=    0.00 PCR=353207.00
         VCI/VPI= 6 CCR= 35320.00 ACR=    0.00 PCR= 35320.00
         VCI/VPI= 7 CCR=     0.00 ACR=    0.00 PCR=353207.00
Cell Time: 17 unhappy=2 CFB= 11869.83 MRV=2 BWmax= 58869.00
         VCI/VPI= 0 CCR= 58869.00 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 70738.83 ACR=    0.00 PCR=353207.00
         VCI/VPI= 4 CCR= 35320.00 ACR=    0.00 PCR= 35320.00
         VCI/VPI= 5 CCR= 35129.34 ACR=    0.00 PCR=353207.00
         VCI/VPI= 6 CCR= 35320.00 ACR=    0.00 PCR= 35320.00
         VCI/VPI= 7 CCR= 0.00 ACR=         0.00 PCR=353207.00
Cell Time: 18 unhappy=2 CFB=    0.00 MRV=2 BWmax= 43202.61
         VCI/VPI= 0 CCR= 58869.00 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 70738.83 ACR=    0.00 PCR=353207.00
         VCI/VPI= 4 CCR= 35320.00 ACR=    0.00 PCR= 35320.00
         VCI/VPI= 5 CCR= 35129.34 ACR=    0.00 PCR=353207.00
         VCI/VPI= 6 CCR= 35320.00 ACR=    0.00 PCR= 35320.00
         VCI/VPI= 7 CCR= 11889.83 ACR=    0.00 PCR=353207.00
Cell Time:19 unhappy=2 CFB=    0.00 MRV=2 BWmax= 43202.61
         VCI/VPI= 0 CCR= 58869.00 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 70738.83 ACR=    0.00 PCR=353207.00
         VCI/VPI= 4 CCR= 35320.00 ACR=    0.00 PCR= 35320.00
         VCI/VPI= 5 CCR= 35129.34 ACR=    0.00 PCR=353207.00
         VCI/VPI= 6 CCR= 35320.00 ACR=    0.00 PCR= 35320.00
         VCI/VPI= 7 CCR= 11869.83 ACR=    0.00 PCR=353207.00
Cell Time: 20 unhappy=2 CFB=    0.00 MRV=2 BWmax= 43202.61
         VCI/VPI= 0 CCR= 58869.00 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 70738.83 ACR=    0.00 PCR=353207.00
         VCI/VPI= 4 CCR= 35320.00 ACR=    0.00 PCR= 35320.00
         VCI/VPI= 5 CCR= 35129.34 ACR=    0.00 PCR=353207.00
         VCI/VPI= 6 CCR= 35320.00 ACR=    0.00 PCR= 35320.00
         VCI/VPI= 7 CCR= 11869.83 ACR=    0.00 PCR=353207.00
Cell Time: 21 unhappy=2 CFB= 27536.22 MRV=2 BWmax= 43202.61
         VCI/VPI= 0 CCR= 58869.00 ACR=    0.00 PCR=353207.00
         VCI/VPI= 1 CCR= 35320.00 ACR=    0.00 PCR= 35320.00
         VCI/VPI= 2 CCR= 70640.00 ACR=    0.00 PCR= 70640.00
         VCI/VPI= 3 CCR= 43202.61 ACR=    0.00 PCR=353207.00
         VCI/VPI= 4 CCR= 35320.00 ACR=    0.00 PCR= 35320.00
```

APPENDIX-continued

```
          VCI/VPI= 5 CCR= 35129.34 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 22 unhappy=2 CFB= 43202.61 MRV=2 BWmax= 43202.61
          VCI/VPI= 0 CCR= 43202.61 ACR=   0.00 PCR=353207.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR=353207.00
          VCI/VPI= 4 CCR= 35320.00 ACR=   0.00 PCR= 35320.00
          VCI/VPI= 5 CCR= 35129.34 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 23 unhappy=1 CFB= 35129.34 MRV=2 BWmax= 43202.61
          VCI/VPI= 0 CCR= 43202.61 ACR=   0.00 PCR=353207.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR=353207.00
          VCI/VPI= 4 CCR= 35320.00 ACR=   0.00 PCR= 35320.00
          VCI/VPI= 5 CCR= 43202.61 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 24 unhappy=1 CFB= 35129.34 MRV=2 BWmax= 43202.61
          VCI/VPI= 0 CCR= 43202.61 ACR=   0.00 PCR=353207.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR=353207.00
          VCI/VPI= 4 CCR= 35320.00 ACR=   0.00 PCR= 35320.00
          VCI/VPI= 5 CCR= 43202.61 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 25 unhappy=1 CFB= 35129.34 MRV=2 BWmax= 43202.61
          VCI/VPI= 0 CCR= 43202.61 ACR=   0.00 PCR=353207.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR= 353207.00
          VCI/VPI= 4 CCR= 35320.00 ACR=   0.00 PCR= 35320.00
          VCI/VPI= 5 CCR= 43202.61 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 26 unhappy=1 CFB= 35129.34 MRV=2 BWmax= 43202.61
          VCI/VPI= 0 CCR= 43202.61 ACR=   0.00 PCR=353207.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR=353207.00
          VCI/VPI= 4 CCR= 35320.00 ACR=   0.00 PCR= 35320.00
          VCI/VPI= 5 CCR= 43202.61 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 27 unhappy=1 CFB= 35129.34 MRV=2 BWmax= 43202.61
          VCI/VPI= 0 CCR= 43202.61 ACR=   0.00 PCR=353207.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR=353207.00
          VCI/VPI= 4 CCR= 35320.00 ACR=   0.00 PCR= 35320.00
          VCI/VPI= 5 CCR= 43202.61 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 28 unhappy=1 CFB= 35129.34 MRV=2 BWmax= 43202.61
          VCI/VPI= 0 CCR= 43202.61 ACR=   0.00 PCR=353207.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR=353207.00
          VCI/VPI= 4 CCR= 35320.00 ACR=   0.00 PCR= 35320.00
          VCI/VPI= 5 CCR= 43202.61 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 29 unhappy=1 CFB= 35129.34 MRV=2 BWmax= 43202.61
          VCI/VPI= 0 CCR= 43202.61 ACR=   0.00 PCR=353207.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR=353207.00
          VCI/VPI= 4 CCR= 35320.00 ACR=   0.00 PCR= 35320.00
          VCI/VPI= 5 CCR= 43202.61 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 30 unhappy=1 CFB= 35129.34 MRV=2 BWmax= 43202.61
          VCI/VPI= 0 CCR= 43202.61 ACR=   0.00 PCR=353207.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR=353207.00
          VCI/VPI= 4 CCR= 35320.00 ACR=   0.00 PCR= 35320.00
          VCI/VPI= 5 CCR= 43202.61 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 31 unhappy=1 CFB= 35129.34 MRV=2 BWmax= 43202.61
          VCI/VPI= 0 CCR= 43202.61 ACR=   0.00 PCR=353207.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR=353207.00
          VCI/VPI= 4 CCR= 35320.00 ACR=   0.00 PCR= 35320.00
          VCI/VPI= 5 CCR= 43202.61 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 32 unhappy=1 CFB=   35129.34 MRV=2 BWmax= 43202.61
          VCI/VPI= 0 CCR= 43202.61 ACR=   0.00 PCR=353207.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR=353207.00
          VCI/VPI= 4 CCR= 35320.00 ACR=   0.00 PCR= 35320.00
          VCI/VPI= 5 CCR= 43202.61 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 33 unhappy=1 CFB= 35129.34 MRV=2 BWmax= 43202.61
          VCI/VPI= 0 CCR= 43202.61 ACR=   0.00 PCR=353207.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR=353207.00
          VCI/VPI= 4 CCR= 35320.00 ACR=   0.00 PCR= 35320.00
          VCI/VPI= 5 CCR= 43202.61 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 34 unhappy=1 CFB= 35129.34 MRV=2 BWmax=43202.61
          VCI/VPI= 0 CCR= 43202.61 ACR=   0.00 PCR 353207.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR=353207.00
          VCI/VPI= 4 CCR= 35320.00 ACR=   0.00 PCR= 35320.00
          VCI/VPI= 5 CCR= 43202.61 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 35 unhappy=1 CFB=35129.34 MRV=2 BWmax= 43202.61
          VCI/VPI= 0 CCR= 43202.61 ACR=   0.00 PCR=353207.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR=353207.00
          VCI/VPI= 4 CCR= 35320.00 ACR=   0.00 PCR= 35320.00
          VCI/VPI= 5 CCR= 43202.61 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 36 unhappy=1 CFB= 35129.34 MRV=2 BWmax= 43202.61
          VCI/VPI= 0 CCR= 43202.61 ACR=   0.00 PCR=353207.00.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR=353207.00
          VCI/VPI= 4 CCR= 35320.00 ACR=   0.00 PCR= 35320.00
          VCI/VPI= 5 CCR= 43202.61 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 37 unhappy=1 CFB= 35129.34 MRV=2 BWmax= 43202.61
          VCI/VPI= 0 CCR= 43202.61 ACR=   0.00 PCR=353207.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR=353207.00
          VCI/VPI= 4 CCR= 35320.00 ACR=   0.00 PCR= 35320.00
          VCI/VPI= 5 CCR= 43202.61 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 38 unhappy=1 CFB= 35129.34 MRV=2 BWmax= 43202.61
          VCI/VPI= 0 CCR= 43202.61 ACR=   0.00 PCR=353207.00
          VCI/VPI= 1 CCR= 35320.00 ACR=   0.00 PCR= 35320.00
          VCI/VPI= 2 CCR= 70640.00 ACR=   0.00 PCR= 70640.00
          VCI/VPI= 3 CCR= 43202.61 ACR=   0.00 PCR=353207.00
          VCI/VPI= 4 CCR= 35320.00 ACR=   0.00 PCR= 35320.00
          VCI/VPI= 5 CCR= 43202.61 ACR=   0.00 PCR=353207.00
          VCI/VPI= 6 CCR= 35320.00 ACR=   0.00 PCR= 35320.00
          VCI/VPI= 7 CCR= 11869.83 ACR=   0.00 PCR=353207.00
Cell Time: 39 unhappy=1 CFB= 35129.34 MRV=2 BWmax= 43202.61
          VCI/VPI= 0 CCR= 43202.61 ACR=   0.00 PCR=353207.00
```

APPENDIX-continued

```
    VCI/VPI= 1 CCR= 35320.00 ACR=     0.00 PCR= 35320.00
    VCI/VPI= 2 CCR= 70640.00 ACR=     0.00 PCR= 70640.00
    VCI/VPI= 3 CCR= 43202.61 ACR=     0.00 PCR=353207.00
    VCI/VPI= 4 CCR= 35320.00 ACR=     0.00 PCR= 35320.00
    VCI/VPI= 5 CCR= 43202.61 ACR=     0.00 PCR=353207.00
    VCI/VPI= 6 CCR= 35320.00 ACR=     0.00 PCR= 35320.00
    VCI/VPI= 7 CCR= 11869.83 ACR=     0.00 PCR=353207.00
Cell Time: 40 unhappy=1 CFB= 35129.34 MRV=2 BWmax= 43202.61
    VCI/VPI= 0 CCR= 43202.61 ACR=     0.00 PCR=353207.00
    VCI/VPI= 1 CCR= 35320.00 ACR=     0.00 PCR= 35320.00
    VCI/VPI= 2 CCR= 70640.00 ACR=     0.00 PCR= 70640.00
    VCI/VPI= 3 CCR= 43202.61 ACR=     0.00 PCR=353207.00
    VCI/VPI= 4 CCR= 35320.00 ACR=     0.00 PCR= 35320.00
    VCI/VPI= 5 CCR= 43202.61 ACR=     0.00 PCR=353207.00
    VCI/VPI= 6 CCR= 35320.00 ACR=     0.00 PCR= 35320.00
    VCI/VPI= 7 CCR= 11869.83 ACR=     0.00 PCR=353207.00
Cell Time: 41 unhappy=1 CFB=     0.00 MRV=2 BWmax= 52274.65
    VCI/VPI= 0 CCR= 43202.61 ACR=     0.00 PCR=353207.00
    VCI/VPI= 1 CCR= 35320.00 ACR=     0.00 PCR= 35320.00
    VCI/VPI= 2 CCR= 70640.00 ACR=     0.00 PCR= 70640.00
    VCI/VPI= 3 CCR= 43202.61 ACR=     0.00 PCR=353207.00
    VCI/VPI= 4 CCR= 35320.00 ACR=     0.00 PCR= 35320.00
    VCI/VPI= 5 CCR= 43202.61 ACR=     0.00 PCR=353207.00
    VCI/VPI= 6 CCR= 35320.00 ACR=     0.00 PCR= 35320.00
    VCI/VPI= 7 CCR= 46999.17 ACR=     0.00 PCR=353207.00
Cell Time: 42 unhappy=2 CFB=     0.00 MRV=2 BWmax= 49250.64
    VCI/VPI= 0 CCR= 43202.61 ACR=     0.00 PCR=353207.00
    VCI/VPI= 1 CCR= 35320.00 ACR=     0.00 PCR= 35320.00
    VCI/VPI= 2 CCR= 70640.00 ACR=     0.00 PCR= 70640.00
    VCI/VPI= 3 CCR= 43202.61 ACR=     0.00 PCR=353207.00
    VCI/VPI= 4 CCR= 35320.00 ACR=     0.00 PCR= 35320.00
    VCI/VPI= 5 CCR= 43202.61 ACR=     0.00 PCR=353207.00
    VCI/VPI= 6 CCR= 35320.00 ACR=     0.00 PCR= 35320.00
    VCI/VPI= 7 CCR= 46999.17 ACR=     0.00 PCR=353207.00
Cell Time: 43 unhappy=3 CFB=     0.00 MRV=2 BWmax= 47234.63
    VCI/VPI= 0 CCR= 43202.61 ACR=     0.00 PCR=353207.00
    VCI/VPI= 1 CCR= 35320.00 ACR=     0.00 PCR= 35320.00
    VCI/VPI= 2 CCR= 70640.00 ACR=     0.00 PCR= 70640.00
    VCI/VPI= 3 CCR= 43202.61 ACR=     0.00 PCR=353207.00
    VCI/VPI= 4 CCR= 35320.00 ACR=     0.00 PCR= 35320.00
    VCI/VPI= 5 CCR= 43202.61 ACR=     0.00 PCR=353207.00
    VCI/VPI= 6 CCR= 35320.00 ACR=     0.00 PCR= 35320.00
    VCI/VPI= 7 CCR= 46999.17 ACR=     0.00 PCR=353207.00
Cell Time: 44 unhappy=3 CFB=     0.00 MRV=2 BWmax= 47234.63
    VCI/VPI= 0 CCR= 43202.61 ACR=     0.00 PCR=353207.00
    VCI/VPI= 1 CCR= 35320.00 ACR=     0.00 PCR= 35320.00
    VCI/VPI= 2 CCR= 70640.00 ACR=     0.00 PCR= 70640.00
    VCI/VPI= 3 CCR= 43202.61 ACR=     0.00 PCR=353207.00
    VCI/VPI= 4 CCR= 35320.00 ACR=     0.00 PCR= 35320.00
    VCI/VPI= 5 CCR= 43202.61 ACR=     0.00 PCR=353207.00
    VCI/VPI= 6 CCR= 35320.00 ACR=     0.00 PCR= 35320.00
    VCI/VPI= 7 CCR= 46999.17 ACR=     0.00 PCR=353207.00
Cell Time: 45 unhappy=3 CFB=     0.00 MRV=2 BWmax= 47234.63
    VCI/VPI= 0 CCR= 43202.61 ACR=     0.00 PCR=353207.00
    VCI/VPI= 1 CCR= 35320.00 ACR=     0.00 PCR= 35320.00
    VCI/VPI= 2 CCR= 70640.00 ACR=     0.00 PCR= 70640.00
    VCI/VPI= 3 CCR= 43202.61 ACR=     0.00 PCR=353207.00
    VCI/VPI= 4 CCR= 35320.00 ACR=     0.00 PCR= 35320.00
    VCI/VPI= 5 CCR= 43202.61 ACR=     0.00 PCR=353207.00
    VCI/VPI= 6 CCR= 35320.00 ACR=     0.00 PCR= 35320.00
    VCI/VPI= 7 CCR= 46999.17 ACR=     0.00 PCR=353207.00
Cell Time: 46 unhappy=4 CFB=     0.00 MRV=2 BWmax= 45890.62
    VCI/VPI= 0 CCR= 43202.61 ACR=     0.00 PCR=353207.00
    VCI/VPI= 1 CCR= 35320.00 ACR=     0.00 PCR= 35320.00
    VCI/VPI= 2 CCR= 70640.00 ACR=     0.00 PCR= 70640.00
    VCI/VPI= 3 CCR= 43202.61 ACR=     0.00 PCR=353207.00
    VCI/VPI= 4 CCR= 35320.00 ACR=     0.00 PCR= 35320.00
    VCI/VPI= 5 CCR= 43202.61 ACR=     0.00 PCR=353207.00
    VCI/VPI= 6 CCR= 35320.00 ACR=     0.00 PCR= 35320.00
    VCI/VPI= 7 CCR= 46999.17 ACR=     0.00 PCR=353207.00
Cell Time: 47 unhappy=4 CFB=     0.00 MRV=2 BWmax= 45890.62
    VCI/VPI= 0 CCR= 43202.61 ACR=     0.00 PCR=353207.00
    VCI/VPI= 1 CCR= 35320.00 ACR=     0.00 PCR= 35320.00
    VCI/VPI= 2 CCR= 70640.00 ACR=     0.00 PCR= 70640.00
    VCI/VPI= 3 CCR= 43202.61 ACR=     0.00 PCR=353207.00
    VCI/VPI= 4 CCR= 35320.00 ACR=     0.00 PCR= 35320.00
    VCI/VPI= 5 CCR= 43202.61 ACR=     0.00 PCR=353207.00
    VCI/VPI= 6 CCR= 35320.00 ACR=     0.00 PCR= 35320.00
    VCI/VPI= 7 CCR= 46999.17 ACR=     0.00 PCR=353207.00
Cell Time: 48 unhappy=4 CFB=     0.00 MRV=2 BWmax= 44994.62
    VCI/VPI= 0 CCR= 43202.61 ACR=     0.00 PCR=353207.00
    VCI/VPI= 1 CCR= 35320.00 ACR=     0.00 PCR= 35320.00
    VCI/VPI= 2 CCR= 70640.00 ACR=     0.00 PCR= 70640.00
    VCI/VPI= 3 CCR= 43202.61 ACR=     0.00 PCR=353207.00
    VCI/VPI= 4 CCR= 35320.00 ACR=     0.00 PCR= 35320.00
    VCI/VPI= 5 CCR= 43202.61 ACR=     0.00 PCR=353207.00
    VCI/VPI= 6 CCR= 35320.00 ACR=     0.00 PCR= 35320.00
    VCI/VPI= 7 CCR= 46999.17 ACR=     0.00 PCR=353207.00
Cell Time: 49 unhappy=4 CFB=     0.00 MRV=2 BWmax= 44994.62
    VCI/VPI= 0 CCR= 43202.61 ACR=     0.00 PCR=353207.00
    VCI/VPI= 1 CCR= 35320.00 ACR=     0.00 PCR= 35320.00
    VCI/VPI= 2 CCR= 70640.00 ACR=     0.00 PCR= 70640.00
    VCI/VPI= 3 CCR= 43202.61 ACR=     0.00 PCR=353207.00
    VCI/VPI= 4 CCR= 35320.00 ACR=     0.00 PCR= 35320.00
    VCI/VPI= 5 CCR= 43202.61 ACR=     0.00 PCR=353207.00
    VCI/VPI= 6 CCR= 35320.00 ACR=     0.00 PCR= 35320.00
    VCI/VPI= 7 CCR= 46999.17 ACR=     0.00 PCR=353207.00
Cell Time: 50 unhappy=4 CFB=     0.00 MRV=2 BWmax= 44994.62
    VCI/VPI= 0 CCR= 43202.61 ACR=     0.00 PCR=353207.00
    VCI/VPI= 1 CCR= 35320.00 ACR=     0.00 PCR= 35320.00
    VCI/VPI= 2 CCR= 70640.00 ACR=     0.00 PCR= 70640.00
    VCI/VPI= 3 CCR= 43202.61 ACR=     0.00 PCR=353207.00
    VCI/VPI= 4 CCR= 35320.00 ACR=     0.00 PCR= 35320.00
    VCI/VPI= 5 CCR= 43202.61 ACR=     0.00 PCR=353207.00
    VCI/VPI= 6 CCR= 35320.00 ACR=     0.00 PCR= 35320.00
    VCI/VPI= 7 CCR= 46999.17 ACR=     0.00 PCR=353207.00
```

What is claimed is:

1. A method for providing service to entities comprising the steps of:

receiving a first request for service by a server within a predetermined time from a first entity;

producing a rate assignment to the first entity;

receiving a second request for service by the server within the predetermined time from a second entity;

producing a rate assignment to the second entity;

adjusting the rate assignment to the first entity so the service to the first entity and the second entity;

allocating explicitly service to the second entity from service originally provided by the server to the first entity based on max-min fairness;

reducing the service to be provided by the server to the first entity while the second entity is waiting for service so the second entity can be provided service by the server within the predetermined time;

receiving a request for service by the server from a third entity who has a priority status that entitles the third entity to receive as much service from the server as the third entity needs;

producing a rate assignment to the third entity;

providing by the server all the service requested of it by the third entity; adjusting the rate assignment to the first entity and to the second entity so the service to the first entity, second entity and the third entity converge to a max-min fair allocation; reducing the amount of service provided by the server to the first and second entities by an amount necessary to provide all the service by the server requested of it by the third entity; and receiving a fourth request for service from the second entity with a minimum rate which is more than the service available for the second entity by the server; and providing service to the second entity in an amount equal to the minimum rate.

2. A method as described in claim 1 including after the receiving the first request step, there is the step of providing service by the server to the first entity.

3. A method as described in claim 1 including after the reducing step, there is the step of providing service by the server to the second entity.

4. A method as described in claim 3 including after the reducing step, there is the step of providing a reduced amount of service to the first entity.

5. A method as described in claim 3 including after the step of providing service to the second entity, there is the step of increasing the amount of service provided by the server to the first entity.

6. A method as described in claim 5 including before the increasing step, there is the step of making available service that was provided by the server to the second entity.

7. A method as described in claim 6 including after the making available step, there is the step of determining that there are no other requests for service by the server from entities other than the first entity which have not been satisfied.

8. A method as described in claim 3 wherein the receiving the second request step includes the step of receiving a second request for service which is less than the maximum share of service available by the server for the second entity.

9. A method as described in claim 8 wherein the receiving the second request step includes the step of receiving a second request for service which is less than the service available by the server for the second entity.

10. A method as described in claim 9 wherein the providing service by the server to the second entity step includes the step of providing the same amount of service to the second entity as the service requested of the server by the second entity.

11. A method as described in claim 8 wherein the receiving the second request step includes the step of receiving a second request for service which is more than the service available by the server for the second entity.

12. A method as described in claim 11 wherein the second request step includes the steps of receiving a second request for service with a minimum rate which is less that the service available to the second entity by the server; and wherein the step of providing service to the second entity includes the step of providing the service to the second entity at the service available to the second entity by the server.

13. A method as described in claim 12 wherein the second request step includes the step of adjusting a maximum share of service available to the second entity by the server downward.

14. A method as described in claim 11 wherein the second requesting step includes the step of adjusting a maximum share of service available to the second entity by the server downward.

15. A method as described in claim 3 wherein the receiving the second request step includes the step of receiving a second request for service which is greater than the maximum share of service available by the server for the second entity.

16. A method as described in claim 15 wherein the receiving the second request step includes the step of receiving a second request for service from the second entity which has a maximum share of service which is less than the service available by the server for the second entity; and the providing service by the server to the second entity step includes the step of providing service to the second entity equal to the maximum share of service available by the server for the second entity.

17. A system for providing service comprising:

N entities, where N is greater than or equal to 2, each of the N entities require service;

a server which provides service to the N entities, said server includes a host which writes desired traffic parameters for a virtual connection and the amount of requested bandwidth for the connection to the transmit scheduler; and a transmit scheduler connected to the entities and the server, said scheduler providing service to the N entities by reducing the amount of service to at least one of the N entities from the server until all of the N entities receive their minimum amount of service, said scheduler includes a bandwidth allocator which controls the amount of service by the server to the N entities so each of the N entities receives at least its minimum required amount of service, said scheduler including means for explicitly allocating service to the N entities by reducing service originally provided by the server to at least one of the entities until all of the N entities receive their minimum amount of service and converge to a max-min fair allocation based on max-min fairness according to a decision tree and a movable ceiling which represents a current max-min fair share, with the ceiling increasing when there is free bandwidth available and with the ceiling decreasing when demand from the first and second entities exceeds bandwidth currently available from the server.

18. A system as described in claim 17 wherein the server includes a host memory for holding data packets written by the host, and a packet ready queue for holding descriptors for the data packets in the host memory.

19. A system as described in claim 18 wherein each of the N entities require at least a minimum amount of service.

20. A system as described in claim 19 wherein said scheduler increases the amount of service to entities requesting service after an entity receives the service the entity has requested.

* * * * *